H. A. DE VRY.
MOTION PICTURE MACHINE.
APPLICATION FILED AUG. 16, 1915.

1,303,543.

Patented May 13, 1919.
7 SHEETS—SHEET 1.

Fig. 1.

Witness:
John Enders

Inventor:
Herman A. de Vry.
By Fred Gerlach
his Atty

H. A. DE VRY.
MOTION PICTURE MACHINE.
APPLICATION FILED AUG. 16, 1915.

1,303,543.

Patented May 13, 1919.
7 SHEETS—SHEET 3.

Fig. 3.

Witness:
John Enders

Inventor:
Herman A. de Vry.
by Fred Gerlach
his Atty.

H. A. DE VRY.
MOTION PICTURE MACHINE.
APPLICATION FILED AUG. 16, 1915.

1,303,543.

Patented May 13, 1919.
7 SHEETS—SHEET 5.

Witness:
John Enders

Inventor:
Herman A. de Vry
by Fred Gerlach
his Atty.

UNITED STATES PATENT OFFICE.

HERMAN A. DE VRY, OF CHICAGO, ILLINOIS, ASSIGNOR TO THE DE VRY CORPORATION, OF CHICAGO, ILLINOIS, A CORPORATION OF ILLINOIS.

MOTION-PICTURE MACHINE.

1,303,543.　　　Specification of Letters Patent.　　Patented May 13, 1919.

Application filed August 16, 1915. Serial No. 45,633.

*To all whom it may concern:*

Be it known that I, HERMAN A. DE VRY, a resident of Chicago, in the county of Cook and State of Illinois, have invented certain new and useful Improvements in Motion-Picture Machines, of which the following is a full, clear, and exact description.

The invention relates to motion-picture machines.

Objects of the invention are to provide; an improved moving picture projector in which the feeding mechanism is constructed to operate on a loop of the film between two spools disposed side by side and adapted to receive the film edgewise to facilitate threading or placement of the film into the feed mechanism; an improved machine in which the rewinding mechanism is inclosed in a case with the feed mechanism and the supply and take-up spools; an improved machine in which the mechanisms are constructed so that a portion of the film may be easily and quickly run back or rewound to reëxpose a portion thereof when both ends of the film are inaccessible, or so that only a portion of the film need be exposed when desired; an improved machine in which provision is made for rewinding the film upon the supply spool without displacing either the supply-spool or take-up spool; to provide an improved machine which has the feed-mechanism, spools and rewinding mechanism contained within a single case and adapted for use with illuminating means in the same case; and to provide an improved machine in which the supply and take-up spools are disposed side by side and in which the feed mechanism is organized to dispense with any rollers disposed at an angle to the axes of the spools. Other objects of the invention will appear from the description of the machine.

The invention consists in the several novel features hereinafter set forth and more particularly defined by claims at the conclusion hereof.

The film-supply and take-up spools, feed-mechanism, rewinding mechanism and illuminating means for projecting light through the film are all inclosed within a case comprising a bottom 15, a front 16, a back 17, a top 18, a fixed side 19, and a cover 20 hinged to back 17 at 21 and forming one side of the case. The latter has a transverse partition 22 extending from the back to the front of the case to form a lower compartment therein which is adapted to contain the supply-spool 23, the take-up spool 24 and the rewinding guide-drum 25.

A vertical partition 26 extends between the partition 22 and the top 18 of the case to divide the upper portion thereof into a chamber 27 for the feed-mechanism and a chamber 28 for the illuminating means. The case is lined with asbestos, as at *a*, and partition 26 is formed of asbestos to render the case fireproof. The illuminating means for projecting light through the film comprises an electric lamp 29 mounted in a socket 30 which is supported on a bracket 31 secured to the back of the case. This socket is electrically connected to a switch 32, the button 33 of which extends to the outside of the case. A tube 34 for the condensing lenses is mounted in partition 26 in back of the film and framing device. Lamp 29 is disposed in a box 35 which is separated from the walls of the case and partition 26 by an air space. An inlet 36 is formed in back 17 and an air outlet 37 is formed in the top 18 of the case. Openings 38 are formed in the bottom of box 35 and an opening 39 is formed in the top of the box for ventilating the lamp. This illuminating apparatus forms the subject-matter of an application for Letters Patent being filed by me August 16, 1915, Ser. No. 45,632, so that more detailed illustration and description thereof are not deemed necessary. This illuminating means serves to project light through the film, as it is advanced by the film-feed mechanism hereinafter described.

Spools 23 and 24 are coaxially mounted upon a spindle 41 which is secured by bracket 42 to the fixed side 19 of the case. A sleeve 46 extends through the hub of the take-up spool 24 and is provided with a feather or pin 47 (Fig. 10) for rotating said spool and a pulley 47' whereby it is driven from the feed-mechanism. A sleeve 43 fixed to a rewinding pinion 44 and provided with a pin or feather 45 for turning the spool 23 is interposed between the hub of the spool and spindle 41. In operation, the sleeves 43 and 46 and the spools thereon, rotate in opposite directions, so that sleeve 46 will act as a drag upon the supply-spool during the operation of exposing the film. A spacer sleeve 48 fits loosely between the spools. From the supply-spool, the film 50 passes between a pair of rollers 51 carried by the partition 22. These rollers are in the same vertical plane or alined and have their axes parallel to the axis of the supply-spool. The film in passing from the feed-mechanism to the take-up spool, passes between the rollers 51ª alined with rollers 51 and carried by partition 22.

Figure 1:
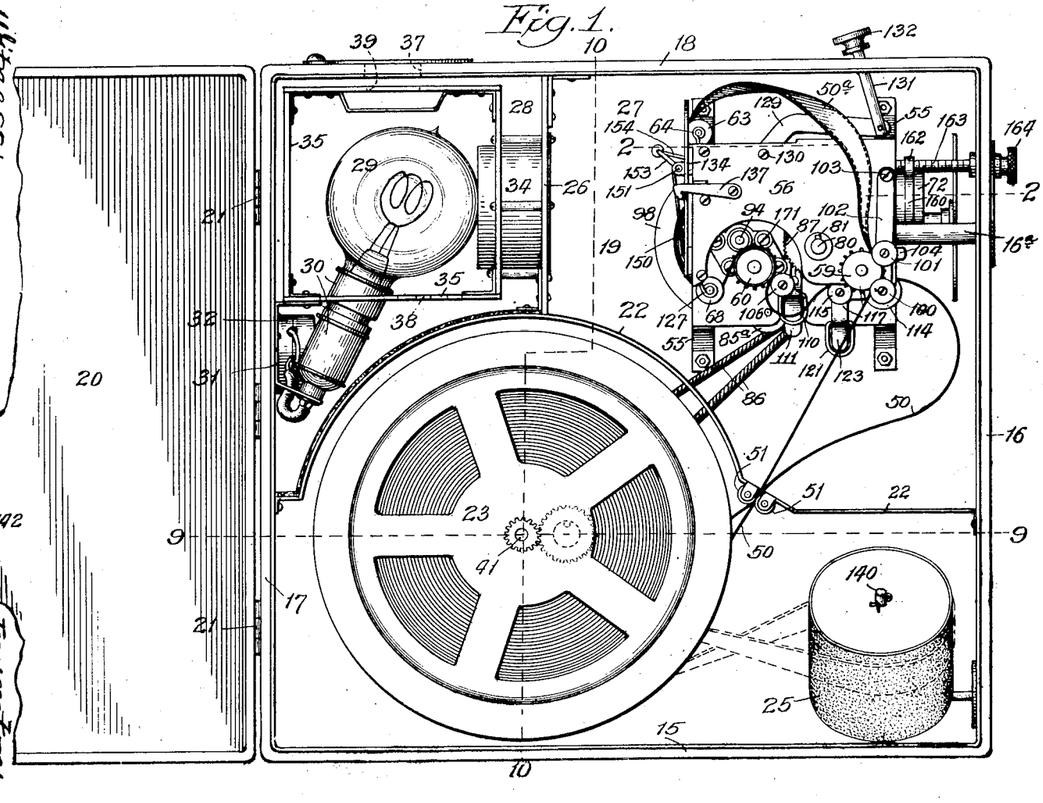
Figure 1 is a side elevation of a machine embodying the invention, the cover forming one side of the case being swung into open position.
Figure 3:
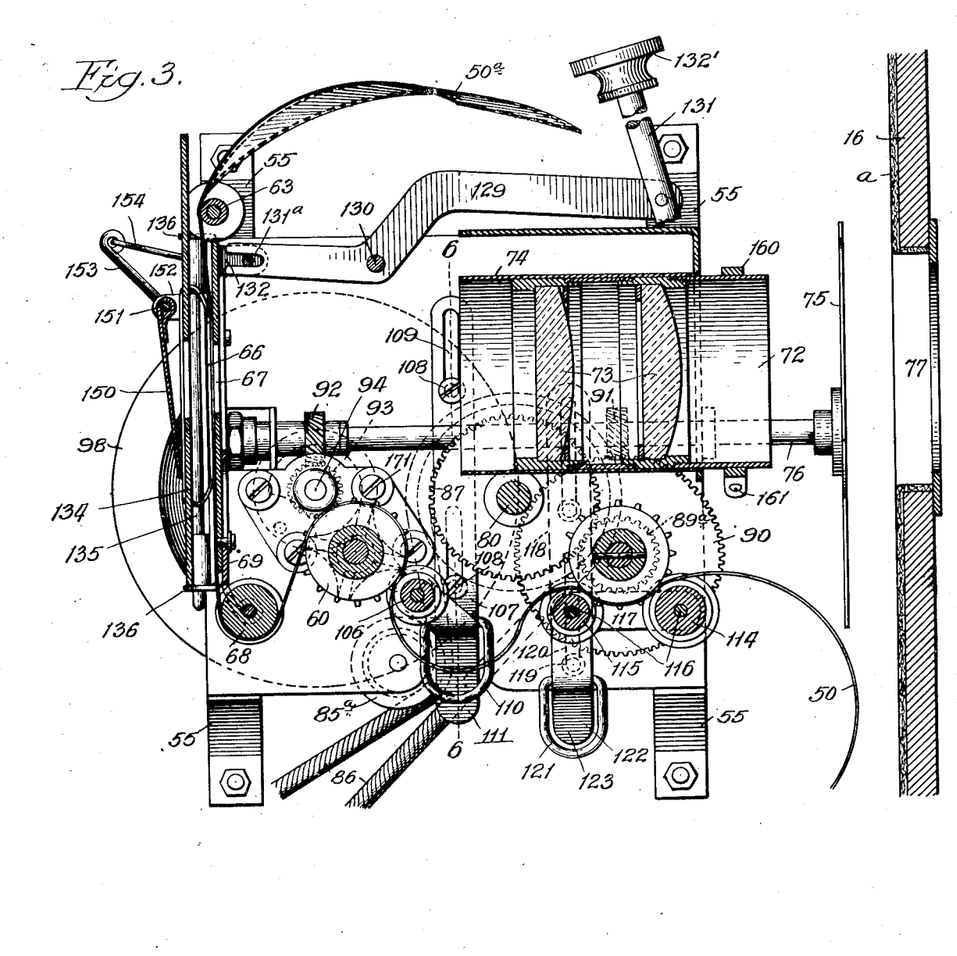
Fig. 3 is a vertical longitudinal section taken on line 3—3 of Fig. 2.

The several parts of the film-feeding mechanism are supported by a frame comprising a plate 54 which is secured by brackets 55 to the fixed side of the inclosing case, a supplemental plate 56, suitably cross-connected to the plate 54, a back-plate 65 and a front plate 57. The feed-mechanism comprises a continuous feed-sprocket 59, an intermittent feed-sprocket 60 and a continuous take-up sprocket 61. All of these sprockets are of the double type suitable for a marginally perforated film. The axes of all of these sprockets are parallel to the axes of the supply and take-up spools. Sprocket 59 is in the plane of the supply spool and sprockets 60 and 61 are in the plane of the take-up spool. The framing device and guide for the film during exposure are alined with the intermittent-sprocket 60 and the take-up spool. From sprocket 59, the film is looped and flexed laterally (Fig. 1) so that it is free to guide itself without the use of rollers that are inclined relatively to the axes of the spools or feed sprockets. The film-loop portion 58 passes to a guide-roller 63 which is mounted in lugs 64 on the back plate 65 of the feed mechanism frame. Thence the film passes downwardly (Fig. 3) between said plate and resilient strips 66 hold the film against the back of said plate as it passes across the exposure-opening 67 in said plate. Thence the film passes under a guide-roller 68 mounted at the lower end of a slidable framing plate 69 and thence partially around and over the intermittent feed-sprocket 60, thence to and under and partially around the take-up sprocket 61 from which it passes between rollers 51ª to the take-up spool.

A tube 72 containing the projecting lenses 73 is slidably mounted in a fixed tube 74 in front of the opening 67 in the back plate 65. A rotating shutter 75 is secured to a shaft 76, to move across the front of the lens-tube. An opening 77 is formed in the front of the case, at the front of the projecting lens-tube 72.

Figure 2:
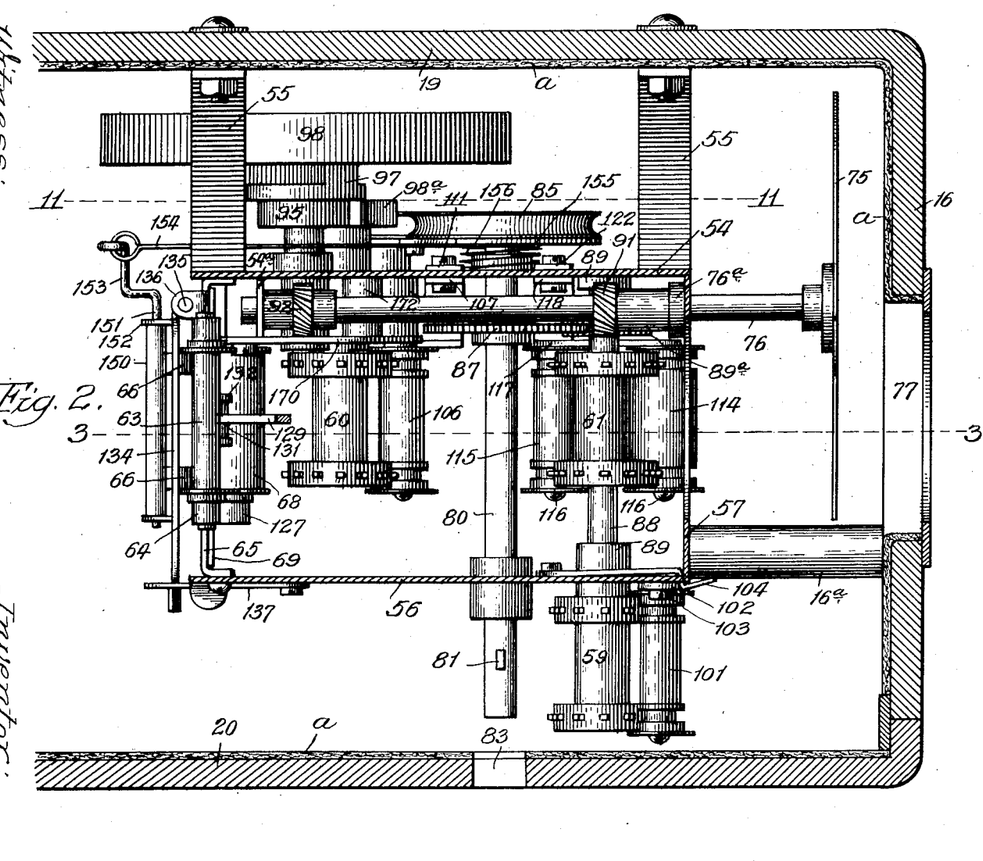
Fig. 2 is a horizontal section taken on line 2—2 of Fig. 1 upon an enlarged scale.

A main drive-shaft 80 is journaled in frame-plates 54 and 56 and is provided with a pin 81 adapted to fit into the notched end of the hollow hub of a crank 82 adapted to extend through an opening 83 in the cover of the case (Fig. 2). This crank is removable from shaft 80 so that the cover can be opened, and so that the crank may be placed in the case when the machine is being transported. This main drive-shaft is provided with a pulley 85 at its inner end which is adapted to drive a spring or coil-wire belt 86 which passes around and drives the pulley 47' to rotate the take-up spool (Figs. 1, 3, 10 and 11). Shaft 80 has fixed thereto, a gear-wheel 87.

The continuous feed sprockets 59 and 61 are fixed on a shaft 88 (Fig. 2) which is journaled in a bearing 89 which is fixed to the frame-plate 54 and in frame-plate 56. A gear wheel 89ª fixed to said shaft, meshes with gear 87 on shaft 80, so that sprockets 61 and 59 will be continuously driven while the main drive shaft 80 is being operated.

Figure 12:
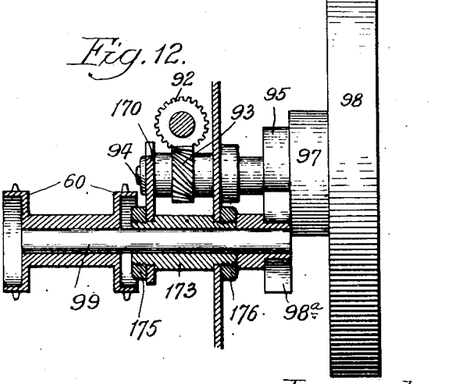
Fig. 12 is a detail of the intermittent drive for the intermittent sprocket.
Figure 13:
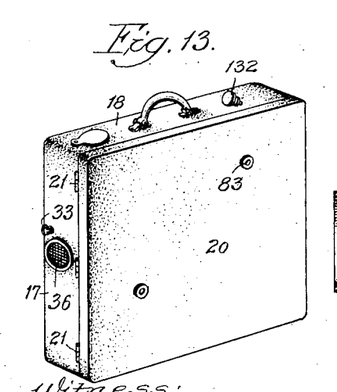
Fig. 13 is a perspective of the case of the machine.
Figure 14:
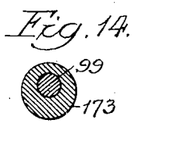
Fig. 14 is a section through the adjustable bearing for the intermittent feed-sprocket.

An oblique-toothed gear 90 (Figs. 2 and 3) is fixed to sprocket-shaft 88 and meshes with a correspondingly toothed pinion 91 which is fixed to the shutter-shaft 76. This shaft imparts movement to the shutter and is also extended rearwardly and provided with an oblique toothed-pinion 92 to impart movement to the intermittent feed-sprocket 60. Gear 92 meshes with an oblique toothed gear 93 on a short shaft 94 (Fig. 12). A notched disk 95 and a pin 96 on the hub 97 of a fly wheel 98 serves to alternately drive and lock a star-wheel 98ª fixed to the shaft 99 of the intermittent feed sprocket 60. This mechanism exemplifies gearing whereby the intermittent feed sprocket is driven through the shutter-shaft and in which the latter is utilized for transmitting motion to the intermittent feed mechanism.

Figure 4:
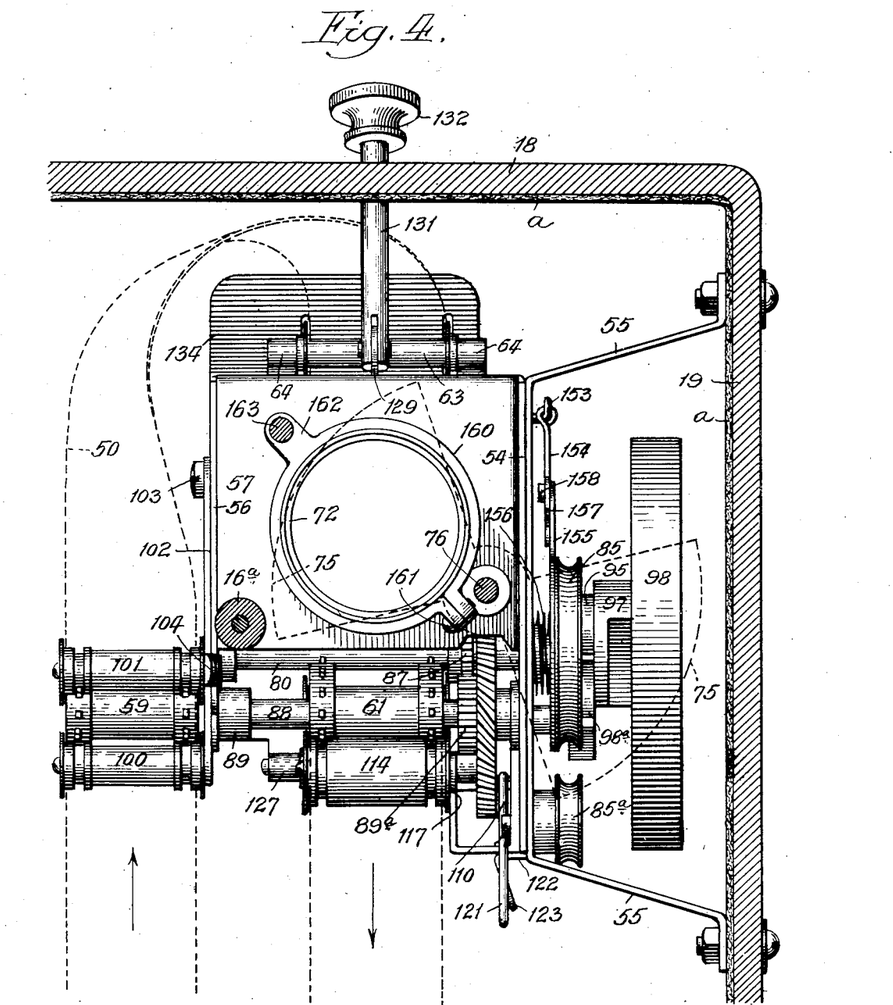
Fig. 4 is a front elevation of the film-feeding mechanism.

A pair of flanged idler rolls 100, 101 (Figs. 1 and 4) for holding the film on the continuous feed sprocket 59 are mounted on studs projecting laterally from an arm 102 which has its upper end pivoted at 103 to the frame-plate 56. A spring-catch 104 (Figs. 1, 2 and 4) is adapted to lock this arm in position to hold the idler rolls in operative relation to the double sprocket 59. In threading or removing the film, it is only necessary to press back the latch 104 and swing arm 102 forwardly, whereupon the idlers and the sprocket will be separated for edgewise insertion or removal of the film. These and all the idler rolls coöperating with the feed-sprockets are grooved opposite the teeth of the sprockets to permit the teeth to pass through the marginal perforations in the film. The outer end of sprocket 59 and the idler rolls 100 and 101 are free to permit the film to be inserted laterally between the sprocket and the idlers. Sprocket 59 is on an outwardly projecting portion of shaft 88 and this manner of supporting it permits a loop of the film to be placed on said sprocket. The film passes under take-up sprocket 61 so that the film loop may, by edgewise movement, be placed on or removed from said sprocket.

Figures 5, 6, 7, 8:
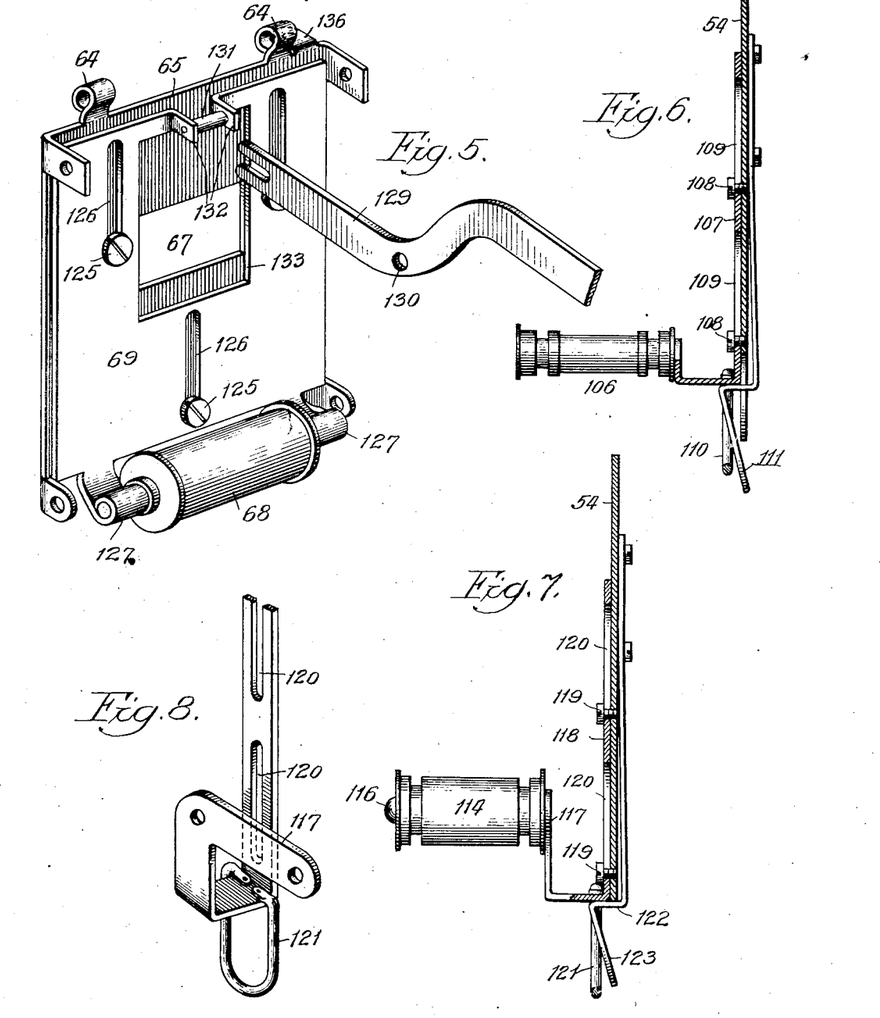
Fig. 5 is a perspective of the framing device.
Fig. 6 is a vertical section taken on line 6—6 of Fig. 3, showing the latch for the support for the roller which holds the film on the intermittent feed sprocket.
Fig. 7 is a section showing the latch for the support for the rollers for holding the film on the take-up sprocket.
Fig. 8 is a perspective of said support.

An idler roll 106 (Fig. 3) is adapted to hold the film on the intermittent feed-sprocket 60. This roller is mounted on a lug on a slidable bar 107 which is slidably mounted on the inner side of frame-plate 54 by screws 108 and slots 109. A stirrup 110 (Figs. 3 and 6) is fixed to the lower end of bar 107 and a spring-latch 111 secured to the outer face of plate 54, is adapted to lock bar 107 in position to hold roller 106 in operative relation to the intermittent feed-sprocket 60. To release bar 107 so that it can be lowered to move roller 106 away from sprocket 60, it is only necessary to insert a finger through the stirrup 110 and push the latch 111 laterally to release the bar, and then with the same finger exert a downward pressure upon stirrup 110. Sprocket 60 and roller 106 are also supported at one end only, so that one end thereof will be free to permit the film to be inserted edgewise between them. This device for locking the support for the roller 106 can be easily and quickly operated for convenience in inserting and removing the film. Upward movement of the bar will cause it to be automatically locked to hold the roller in operative relation to the film.

A pair of flanged rollers 114 and 115 are provided for holding the film on the take-up sprocket 61. These rollers are mounted on studs 116 projecting laterally from an arm 117 of a bar 118 which is slidably mounted on the inner face of frame-plate 54 by screws 119 and slots 120. A stirrup 121 (Figs. 3 and 7) is fixed to the lower end of bar 118 and a spring-latch 122 secured to one face of plate 54 is adapted to hold the bar 118 and the rollers carried thereby in raised position. The finger-piece 123 at the lower end of latch 122 is disposed in the stirrup 121, so that the insertion of a finger in the stirrup will release the latch so that the bar can be lowered by downward pressure upon the stirrup. The latch will automatically lock the bar when the latter is raised. This device exemplifies simple means for unlocking idler rolls 114 and 115 to facilitate edgewise insertion and removal of the film. It will be observed that these idler rolls 114 and 115 are also supported at one end to leave the other end free for the lateral insertion and removal of the film.

The framing slide 69 (Fig. 5) is slidably mounted on the front face of the back-plate 65, by screws 125 and slots 126. Roller 68 is mounted in lugs 127 depending from slide 69. A lever 129, fulcrumed at 130 (Fig. 3), has its rear end forked to engage a pin 131ª secured in forwardly extending lugs 132 on slide 69. The latter is formed with an opening 133 so that the exposure opening 67 will not be obstructed. A rod 131 is pivoted to the front end of lever 129 and extends through the top of the case and is provided with a handle 132' on the outside of the case, so that the framing-slide may be manipulated without opening the case. This framing device is adapted to move the film relatively to the exposure opening 67 by varying the loop of the film between the intermittent feed-sprocket which holds the film and that portion of the film which is held against the back of plate 65.

Spring pressure strips 66 (Figs. 2 and 3) are secured to a gate 134 which is hinged by a rod 135 held in lugs 136 on the fixed frame-plate 65. This gate 134 is hinged to permit the edgewise insertion of the film-loop between plate 65 and the pressure strips 66 (Fig. 2). A latch 137 (Fig. 1) is adapted to hold the hinged plate in operative position. To insert or remove the film between plate 65 and spring 66 and to extend the film around guide-roller 68 on the framing slide and the guide-roller 63 at the upper end of plate 65, it is only necessary to release the hinged plate 134 and swing it backwardly and inwardly.

The feeding and guiding mechanism described exemplify a machine in which the continuous and intermittent feed devices act upon a single loop of the film between the supply and take up spools and in which the different portions of this loop may be placed on these devices and across the plate having the exposure-opening therein, by edgewise insertion, so that the necessity of threading an end through any portion of the mechanism is avoided. It will also be observed that there is no twist in this loop. Both reaches of the loop can be slipped edgewise into or out of the guide-rollers 51, 51ª in partition 22 to facilitate a rewinding of the film at any point, and for this purpose the slot between said rollers in said partition is extended to the open side of the case.

Figures 9, 10:
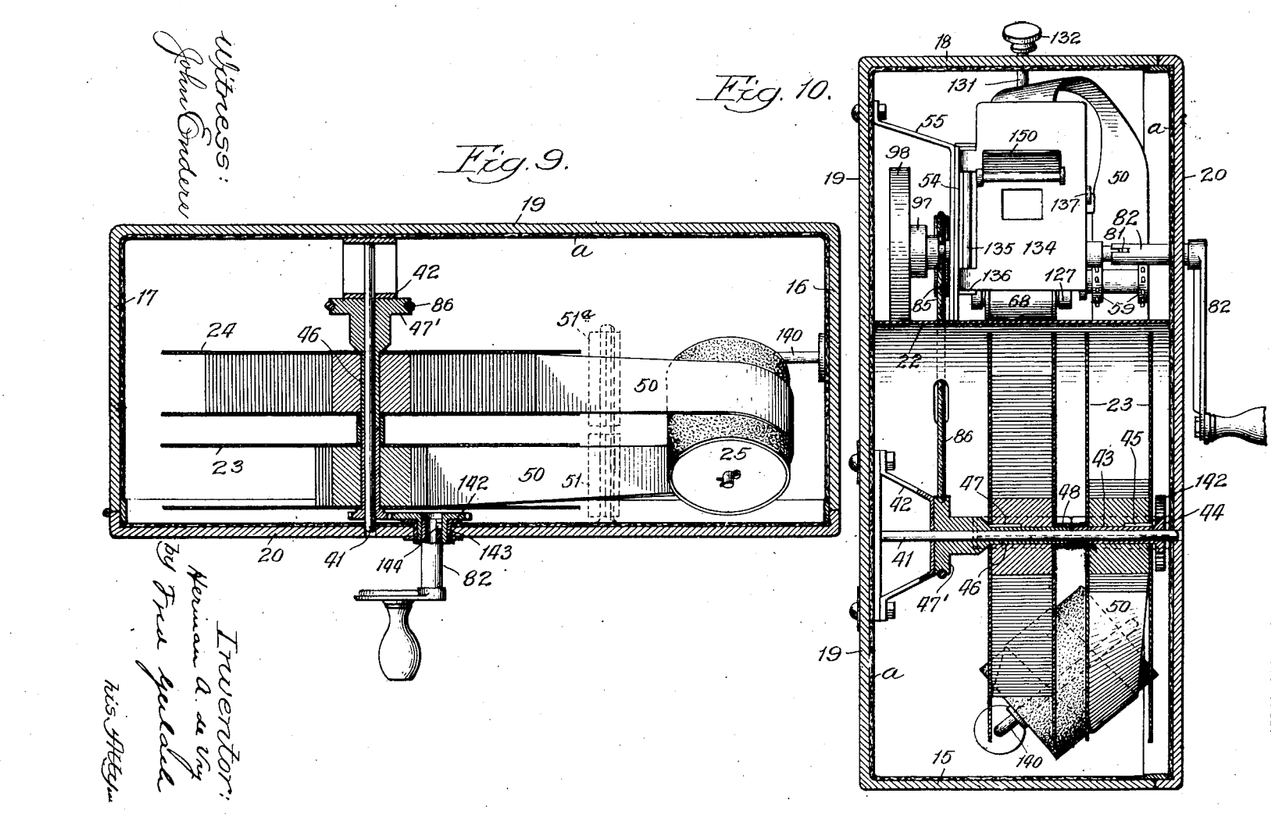
Fig. 9 is a section taken on line 9—9 of Fig. 1.
Fig. 10 is a horizontal section taken on line 10—10 of Fig. 1, the film being shown on the rewinding guide-drum.
Figure 11:
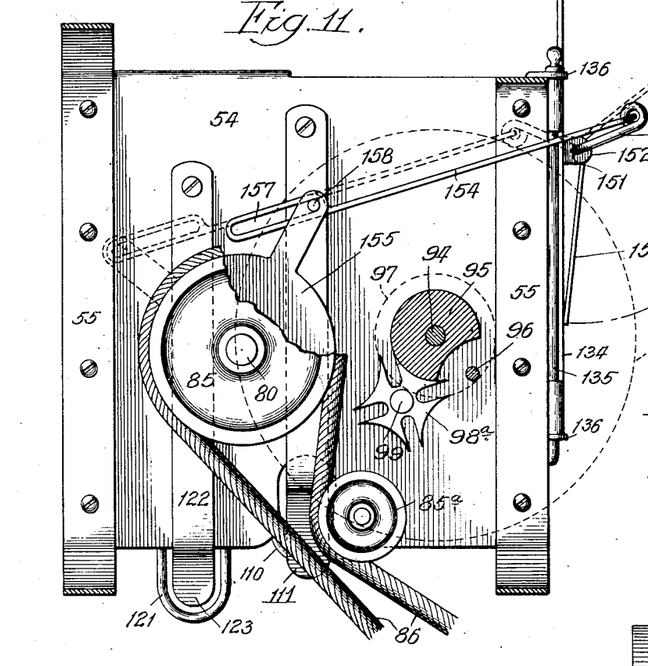
Fig. 11 is a transverse section taken on line 11—11 of Fig. 2.

The rewinding idler drum 25 is mounted on a pintle 140 that extends outwardly from the fixed side of the case and is angled relatively to the axis of the spools, to guide the film-loop laterally from the supply spool to the take-up spool, as indicated in Fig. 9. This construction of film-feeding mechanism and rewinding roller and guide devices for the film loop permit the film to be rewound at any desired point and without removing either of the film spools or disconnecting either end of the film from the spools respectively. A gear-wheel 142 is disposed at the inside of the cover 20 and has a hollow hub extending through the cover 20 which is provided with a bearing sleeve 143 for said hub. The hub of gear 142 is provided with a pin 144 which is adapted to receive the slotted inner end of the hub of crank 82. To rewind the film, after it has been looped around drum 25, it is only necessary to insert the hub 82 of crank 83 into the hub of gear 142 and then turn the crank, which will impart movement to the supply-spool 23 through pinion 44, sleeve 43 and pin 45. The spring belt 86 will act as a drag upon the take-up spool 24 during the rewinding operation. This construction exemplifies one in which the crank for operating inclosed film feed mechanism is utilized to operate inclosed rewinding mechanism, and in which rewinding mechanism is disposed in the case.

An automatically operating fire-shutter 150 is adapted to drop over the light-opening in gate 134, being secured at its upper end to a rod 151 which is pivoted in lugs 152 on said gate. Rod 151 has a crank 153 (Fig. 11) at its inner end which is connected by a link 154 to an arm on a disk 155, which is frictionally held against one side of pulley 85 on the main shaft 80 by a light spring 156. Spring 156 is applied to normally hold and turn disk 155 in position to hold door 150 closed. Link 154 has a slot 157 for pin 158 on disk 155 so that the door will not be opened until shaft 80 is being operated at sufficient speed to cause the friction between pulley 85 and disk 155 to operate the link and hold the door 150 raised against the force of spring 156. This device exemplifies simple means for automatically operating the fire-shutter when the machine is in motion.

A split clamping ring 160 (Figs. 3 and 4) is secured on the front end of the lens-tube 72, being secured thereon by a screw 161. A screw-threaded ear 162 is formed on this ring and an adjusting screw 163 passes through said ear, has its inner reduced end journaled in front plate 57, is held against longitudinal movement in the front wall 16 of the case and is provided with a thumb-wheel 164 at its outer end whereby the sleeve may be shifted longitudinally to adjust or focus the lens in the tube. This device exemplifies a simple construction for adjusting the lens from the outside of the inclosing case. The feed-mechanism frame is secured to the front of the case by a post 16ª, and can be easily removed by detaching said post and the brackets 55 from the case.

The outer end of shaft 94 is suitably journaled in a plate 170 which is secured in spaced relation to the frame-plate 54 by screws 171 and spacers 172. This provides a bearing for shaft 94 at each side of gear 93.

In practice, wear occurs in the Geneva-gear for driving the intermittent feed-sprocket and to compensate for wear, shaft 99, to which star-wheel 98 and the intermittent feed sprocket 60 are secured, is eccentrically mounted in frame-plate 54 and a plate 170. This sleeve is locked in said plates by nuts 175 and 176 adapted to clamp the sleeve to said plates. By loosening said nuts, and rotating sleeve 173 the star-wheel and its shaft can be adjusted relatively to pin 96.

Shutter-shaft 76 is mounted in a bearing 76ª in the front plate 57 of the feed-mechanism frame and in an inturned lug 54ª of frame-plate 54. To avoid an unduly large opening in the partition for the spring wire belt 86, idler roll 85ª is employed to guide one reach of said belt. This idler is mounted on frame-plate 54.

In operation, assuming the spools to be in position in the compartment, and assuming the free end of the film to be connected to the take-up spool 24, the film will be unwound sufficiently from supply-spool 23 to form a loop of sufficient reach to pass through the guide-rollers in partition 22, around continuous feed-sprocket 59, thence loosely to roller 63, thence downwardly across the exposure opening and around framing roller 68 over the intermittent feed-sprocket 60, thence under take-up sprocket 61. To insert the film; door 134 will be swung away from plate 65, guide-roller 106 will be moved downwardly away from sprocket 60, guide-rollers 114 and 115 will be moved downwardly away from sprocket 61 and guide-rollers 100 and 101 will be swung forwardly away from the sprocket 59 so that the film-loop can be easily placed in connected relation to the several parts of the feed-mechanism. When this has been done, the gate 134 will be latched in position to cause the pressure strips 66 to engage the film and frictionally hold it against plate 65, roller 106 will be adjusted in operative relation to sprocket 60, rollers 114, 115 will be locked in operative position with respect to sprocket 61 and rollers 100 and 101 will be locked in operative relation to sprocket 59. The cover of the case will then be closed and by applying the operating crank 82 to shaft 80 and turning the crank, the machine will be operated to intermittently advance the film across the exposure-opening and to take up the exposed portion of the film.

If, in the course of exposing a film, it should be desired to reëxpose a portion thereof or to discontinue the projection of the pictures thereon before all of the film has been exposed, it is only necessary to release the idler-rolls and unlock gate 134, whereupon, the entire film-loop can be withdrawn laterally from the feed-mechanism and from the partition 22 and looped around the rewinding drum 25. The crank 82 can then be connected to the rewinding gear 142 whereupon the supply-spool 23 will be operated to wind the film off the take-up spool 24.

The invention thus exemplifies a moving picture projector in which the supply and take-up spools, film-feeding mechanism and rewinding mechanism are all inclosed within a single case for convenience in transportation and operation. The machine is organized so that the feed-mechanism will act upon an untwisted loop between the supply and take-up spools and in such manner that the loop can be inserted into and removed from the feed-mechanism edgewise. The machine, as a whole, is adapted for compact organization of parts and can be easily transported. The idler rolls for holding the film on the feed sprockets are readily and conveniently releasable. The framing device is simple in construction, and is adapted to be operated from the outside of the case. The feed-mechanism is simple in construction and the frame therefor is of such construction that it can be formed of stampings or by dies.

The invention is not to be understood as restricted to the details set forth, since these may be modified within the scope of the appended claims, without departing from the spirit and scope of the invention.

Having thus described my invention, what I claim as new, and desire to secure by Letters Patent, is:—

1. The combination of a substantially rectangular portable carrying case, film supply and take-up means disposed in the lower portion of the case, mechanism for feeding the film disposed in the upper front portion of the case, and a lamp for projecting light through the film disposed in the upper rear portion of the case.

2. The combination of a portable carrying case, supply and take-up spools for the film removably held in the case, a lamp in the case for projecting light through the film, film feeding mechanism in the case, and film rewinding mechanism in the case including guide means for the film and operating mechanism for the supply spool.

3. The combination of a substantially rectangular carrying case, film supply and take-up means disposed in the lower portion of the case, mechanism for feeding the film, disposed in the upper front portion of the case, film rewinding mechanism in the case, and a lamp for projecting light through the film, disposed in the upper rear portion of the case.

4. The combination of a film supply spool, continuous and intermittent film feeding mechanism, a take-up spool, a lamp for projecting light through the film, a rotating shutter between the film and the front of the case, a projecting lens disposed inwardly of the shutter, mechanism for operating the shutter and the film feed mechanism, and a portable carrying case containing said spools, mechanism, lamp, shutter and lens.

5. The combination of a film supply spool, film feeding mechanism, a take-up spool operated by said mechanism, rewinding mechanism whereby the film may be rewound upon the supply-spool and a case inclosing said spools, feed mechanism and rewinding mechanism and comprising a cover, said rewinding mechanism comprising gearing mounted on the cover.

6. The combination of a film supply spool, film feeding mechanism, a take-up spool driven by said mechanism, rewinding mechanism whereby the film may be rewound upon the supply spool, a lamp in the case for projecting light through the film and a case inclosing said spools, lamp, feed mechanism and rewinding mechanism, said rewinding mechanism comprising an idler drum around which the film may be looped to guide it between the spools.

7. The combination of a film supply spool, a take-up spool, mechanism for feeding the film continuously and intermittently, a lamp for projecting light through the film, and a substantially rectangular portable carrying case containing the spools, said mechanism and lamp, the lamp and film feeding mechanism being disposed adjacent the top of the case, the spools being disposed side by side adjacent the bottom of the case.

8. The combination of a film-supply spool, a take-up spool disposed at one side of the supply-spool, film feeding mechanism comprising a continuous feed sprocket alined with the supply-spool, and intermittent and continuous take-up sprockets alined with the take-up spool, said sprockets being mounted to permit edgewise removal and insertion of a loop of film, a lamp for projecting light through the film and a portable carrying case inclosing the spools, lamp, film and feed sprockets.

9. The combination of a film supply spool, a take-up spool, said spools being disposed side by side, film feeding mechanism, a frame for supporting said film feeding mechanism, the latter comprising a continuous feed sprocket supported outside and to one side of said frame and intermittent and continuous take-up sprockets disposed within said frame, said feed-mechanism being mounted to permit the edgewise removal and insertion of a loop of film between the supply and take-up spools, a lamp for projecting light through the film, and a portable carrying case inclosing said spools, lamp and feed mechanism.

10. The combination of a film supply spool, a film take-up spool, film feeding mechanism, a frame in which the film-feeding mechanism is mounted, illuminating means for projecting light through the film, and a portable carrying case comprising a fixed side and a movable side, the frame for the film supporting mechanism being mounted on the fixed side of the case and unattached to the movable side.

11. The combination of a supply spool, a take-up spool, film feeding mechanism comprising elements mounted to permit the edgewise removal and insertion of a loop of the film between the supply and take-up spools, and rewinding mechanism whereby the film may be rewound upon the supply-spool, comprising means to receive said film-loop without displacing the supply or take-up spools.

12. The combination of a supply spool, a take-up spool disposed at one side of the supply spool, film feeding mechanism comprising elements mounted to permit the edgewise removal and insertion of a loop of the film between the supply and take-up spools and rewinding mechanism whereby the film may be rewound upon the supply-spool, comprising means to receive said film loop without displacing the supply or take-up spools.

13. The combination of a supply spool, a take-up spool, film feeding mechanism comprising elements mounted to permit the edgewise removal and insertion of a loop of the film between the supply and take-up spools, and rewinding means whereby the film may be rewound upon the supply-spool, comprising an idler drum adapted to receive said film-loop without displacing the supply or take-up spools.

14. The combination of a supply spool, a take-up spool co-axially mounted with the supply spool, film feeding mechanism comprising elements mounted to permit the edgewise removal and insertion of the loop of the film between the supply and take-up spools and rewinding mechanism whereby the film may be rewound upon the supply spool, comprising means adapted to receive said film loop without displacing the supply or take-up spools.

15. The combination of film supply and take-up means, a rigid frame, continuous and intermittent feed sprockets, transverse shafts for said sprockets disposed in parallel relation to one another, a fixed bearing in the frame for the intermittent sprocket shaft, a longitudinal shaft extending crosswise of and between the intermittent and continuous feed sprockets, bearings rigid in the frame for the longitudinal shaft, a shutter on said longitudinal shaft, gearing between the longitudinal shaft and the intermittent and continuous sprockets, and means for guiding the film across an exposure opening.

16. The combination of film supply and take-up means, a rigid frame, continuous and intermittent feed sprockets, transverse shafts for said sprockets disposed in parallel relation to one another, a longitudinal shaft extending between and crosswise of the intermittent and continuous sprockets, bearings rigid in the frame for the longitudinal shaft, a shutter on said shaft, gearing between the longitudinal shaft and the continuous sprocket, gearing between the longitudinal shaft and the intermittent sprocket shaft, and a bearing for the intermittent sprocket secured in the frame and adjustable therein relatively to the longitudinal shaft.

17. The combination of a film supply spool, a take-up spool, a lamp for projecting light through a film, means to guide the film across an exposure opening, a portable carrying case containing the spools and lamp and guide-means, and film feeding mechanism in the case interposed between the guide means for the film at the exposure opening and the front of the case.

18. The combination of a film supply-spool, a take-up spool, a lamp for projecting light through a film, means to guide the film across an exposure opening, a portable carrying case containing the spools and lamp and guide means, film-feeding mechanism in the case and disposed between the guide-means for the film at the exposure opening and the front of the case and a projecting lens between said guide-means and the front of the case.

19. The combination of co-axially disposed film-supply and take-up spools, film feeding mechanism, and rewinding mechanism whereby the film may be rewound upon the supply-spool, comprising a roller having its axis inclined with respect to the axis of the spools and disposed to guide a loop of the film directly to and from the spools respectively.

20. The combination of co-axially disposed film-supply and take-up spools, film feeding mechanism, and rewinding mechanism whereby the film may be rewound upon the supply-spool comprising a roller having its axis inclined with respect to the axis of the spools and disposed to guide a loop of the film directly to and from the spools respectively, said feeding mechanism being adapted to act upon a loop of film between the spools and for edgewise insertion and removal of the loop.

21. The combination of a film-supply, a main drive shaft, continuous feed and take-up sprockets, a common shaft for said sprockets, an intermittent feed sprocket, guide means for the film across an exposure opening, a shutter, a shaft for the shutter extending transversely to the axes of the feed and take-up sprockets, gearing for driving the shutter shaft and the continuous feed sprockets from the main drive shaft and gearing between the shutter shaft and the intermittent feed sprocket whereby the latter will be driven from the shutter shaft.

22. The combination of a film-supply, a film take-up, film-feeding mechanism, rewinding mechanism, a case inclosing said supply, take-up, feed-mechanism and rewinding mechanism, and a crank adapted to be inserted into the case to operate the feed-mechanism from the outside thereof, the rewinding mechanism being provided with means adapted to be engaged by said crank.

23. The combination of a film-supply, a film take-up, film-feeding mechanism and rewinding mechanism, a case inclosing said supply, take-up, feed mechanism and rewinding mechanism, said case comprising a cover, the rewinding mechanism comprising a gear on the film supply and a gear on the cover adapted to receive a crank.

24. The combination of a film-supply spool, a take-up spool, film feeding mechanism, a case inclosing said supply, take-up, feed-mechanism and rewinding mechanism, a fixed spindle for the spools, a wheel and sleeve on the spindle and for driving the take-up spool, and a gear and sleeve on the spindle for driving the supply spool, said sleeves being removable from the spindle and from the spools, respectively.

HERMAN A. DE VRY.

Witnesses:
FRED GARLACH,
MILDRED STUMPF.